US012168323B2

(12) United States Patent
Biegelsen

(10) Patent No.: US 12,168,323 B2
(45) Date of Patent: Dec. 17, 2024

(54) SYSTEMS AND METHODS FOR CLEANING ORIFICES OF A 3D LIQUID METAL PRINTER

(71) Applicant: XEROX CORPORATION, Norwalk, CT (US)

(72) Inventor: David K. Biegelsen, Portola Valley, CA (US)

(73) Assignee: XEROX CORPORATION, Norwalk, CT (US)

( * ) Notice: Subject to any disclaimer, the term of this patent is extended or adjusted under 35 U.S.C. 154(b) by 741 days.

(21) Appl. No.: 17/380,168

(22) Filed: Jul. 20, 2021

(65) Prior Publication Data

US 2023/0023167 A1  Jan. 26, 2023

(51) Int. Cl.
| | | |
|---|---|---|
| *B29C 64/35* | (2017.01) | |
| *B29C 64/112* | (2017.01) | |
| *B29C 64/209* | (2017.01) | |
| *B29C 64/245* | (2017.01) | |
| *B29C 64/295* | (2017.01) | |
| *B33Y 10/00* | (2015.01) | |
| *B33Y 40/00* | (2020.01) | |
| *B08B 9/045* | (2006.01) | |
| *B22D 23/00* | (2006.01) | |
| *B33Y 30/00* | (2015.01) | |

(52) U.S. Cl.
CPC ............ *B29C 64/35* (2017.08); *B29C 64/112* (2017.08); *B29C 64/209* (2017.08); *B29C 64/245* (2017.08); *B29C 64/295* (2017.08); *B33Y 10/00* (2014.12); *B33Y 40/00* (2014.12); *B08B 9/045* (2013.01); *B08B 2209/032* (2013.01); *B08B 2209/04* (2013.01); *B22D 23/003* (2013.01); *B33Y 30/00* (2014.12)

(58) Field of Classification Search
CPC ..... B29C 64/35; B29C 64/112; B29C 64/209; B29C 64/245; B29C 64/295; B33Y 10/00; B33Y 40/00; B33Y 30/00; B08B 9/045; B08B 2209/032; B08B 2209/04; B22D 23/003; B22F 10/22; B22F 12/13; B22F 12/53
USPC .......................................... 266/135
See application file for complete search history.

(56) References Cited

U.S. PATENT DOCUMENTS

| | | | | |
|---|---|---|---|---|
| 10,195,785 | B2 * | 2/2019 | Jeon ................. | B33Y 40/00 |
| 10,987,856 | B2 * | 4/2021 | Peter ................. | B33Y 70/00 |
| 11,135,775 | B2 * | 10/2021 | Ge .................... | B29C 64/35 |
| 2020/0324341 | A1 * | 10/2020 | Liu .................... | B22F 12/53 |
| 2021/0390224 | A1 * | 12/2021 | Korneev .............. | G06N 3/04 |

FOREIGN PATENT DOCUMENTS

CN  107160694  * 11/2019 ............. B33Y 30/00

OTHER PUBLICATIONS

CN107160694, Zhou et al., 3D printer nozzle cleaning device, Nov. 1, 2019 (Year: 2019).*

* cited by examiner

*Primary Examiner* — Jessee R Roe
*Assistant Examiner* — Michael Aboagye
(74) *Attorney, Agent, or Firm* — MH2 Technology Law Group LLP

(57) ABSTRACT

A 3D printer includes a nozzle and a cleaning system. The cleaning system includes a gas source configured to introduce a gas at least partially into the nozzle. The cleaning system also includes a cleaning tool configured to remove solidified metallic dross from within the nozzle.

18 Claims, 3 Drawing Sheets

SYSTEMS AND METHODS FOR CLEANING ORIFICES OF A 3D LIQUID METAL PRINTER

TECHNICAL FIELD

The present teachings relate generally to three-dimensional (3D) printing and, more particularly, to cleaning orifices of a 3D printer that jets liquid metal.

BACKGROUND

A 3D printer builds (e.g., prints) a 3D object from a computer-aided design (CAD) model, usually by successively depositing material layer upon layer. For example, a first layer may be deposited upon a build stage, and then a second layer may be deposited upon the first layer. One particular type of 3D printer is a magnetohydrodynamic (MHD) printer, which is suitable for depositing liquid metal layer upon layer to form a 3D metallic object. Magnetohydrodynamic refers to the study of the magnetic properties and the behavior of electrically conducting fluids. In a MHD printer, an electrical current flows through a metal coil, which produces time-varying magnetic fields that induce eddy currents within a reservoir of liquid metal compositions. Coupling between magnetic and electric currents within the liquid metal results in Lorentz forces that cause drops of the liquid metal to be ejected (also referred to as jetted) through a nozzle of the printer. The drops land upon the build stage and/or the previously deposited drops to cause the 3D object to grow in size.

However, portions of the printing material (e.g., liquid metal) may solidify in the 3D printer. For example, the printing process may cause a rapid build-up of dross (e.g., oxides and other contaminants) in the orifices of the 3D printer (e.g., the nozzle). Therefore, what is needed is an improved system and method for cleaning orifices of the 3D printer.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A 3D printer is disclosed. The 3D printer includes a nozzle and a cleaning system. The cleaning system includes a gas source configured to introduce a gas at least partially into the nozzle. The cleaning system also includes a cleaning tool configured to remove solidified metallic dross from within the nozzle.

In another embodiment, the 3D printer includes an ejector having a nozzle. The nozzle is configured to jet a plurality of drops of liquid metal therethrough. The 3D printer also includes a build stage positioned at least partially below the nozzle. The drops are configured to cool and solidify on the build stage to form a 3D object. The 3D printer also includes a cleaning system. The 3D printer is configured to actuate from a first state in which the nozzle is positioned above and aligned with the build stage to a second state in which the nozzle is positioned above and aligned with the cleaning system. The cleaning system includes a gas source configured to introduce a gas upward and at least partially into the ejector when the 3D printer is in the second state. The cleaning system also includes a cleaning tool configured to remove solidified metallic dross from within the nozzle when the 3D printer is in the second state.

In another embodiment, the 3D printer includes an ejector having a nozzle. The 3D printer also includes a heating element configured to heat a solid metal within the ejector, thereby converting the solid metal to a liquid metal. The 3D printer also includes a coil wrapped at least partially around the ejector. The 3D printer also includes a power source configured to transmit voltage pulses to the coil. The coil causes a plurality of drops of the liquid metal to be jetted through the nozzle in response to the voltage pulses. The 3D printer also includes a build stage positioned at least partially below the nozzle. The drops are configured to cool and solidify on the build stage to form a 3D object. The 3D printer also includes a cleaning system coupled to the build stage and positioned horizontally to a side of the build stage. The 3D printer is configured to actuate from a first state in which the nozzle is positioned above and aligned with the build stage to a second state in which the nozzle is positioned above and aligned with the cleaning system. The cleaning system includes a connector configured to extend upward and to connect to the nozzle when the 3D printer is in the second state. The cleaning system also includes a gas source configured to introduce a gas upward through the connector and at least partially into the ejector. The gas forms a bubble in the liquid metal in the ejector proximate to the nozzle. The cleaning system also includes a cleaning tool configured to extend upward through the connector and at least partially into the ejector. An upper end of the cleaning tool is positioned within the bubble. The cleaning tool includes a shaft with one or more radial protrusions. The cleaning tool is configured to rotate around a central longitudinal axis through the shaft and to reciprocate vertically, which causes the cleaning tool to dislodge at least a portion of solidified metallic dross within the nozzle such that at least a portion of the dislodged solidified metallic dross becomes positioned within the bubble or exits through the nozzle.

A method is also disclosed. The method includes actuating a printer from a first state in which a nozzle is not aligned with a cleaning system to a second state in which the nozzle is aligned with the cleaning system. The cleaning system includes a gas source. The method also includes introducing a gas at least partially into the nozzle using the gas source.

In another embodiment, the method includes jetting a plurality of drops of liquid printing material through a nozzle of a printer onto a build stage. The drops are configured to cool and solidify on the build stage to form an object. The method also includes actuating the printer from a first state in which the nozzle is positioned above and aligned with the build stage to a second state in which the nozzle is positioned above and aligned with a cleaning system. The method also includes introducing a gas upward at least partially into the nozzle when the printer is in the second state using the cleaning system.

In another embodiment, the method includes jetting a plurality of drops of liquid printing material through a nozzle of a printer onto a build stage. The drops are configured to cool and solidify on the build stage to form an object. The method also includes actuating the printer from a first state in which the nozzle is positioned above and aligned with the build stage to a second state in which the nozzle is positioned above and aligned with a cleaning system. The method also includes extending a connector of the cleaning system upward when the printer is in the second state. The method also includes connecting the connector to the nozzle. The method also includes introducing a gas upward through the connector and at least partially into the nozzle using the cleaning system. The gas forms a bubble in the liquid printing material proximate to the nozzle. The method also includes extending a cleaning tool of the cleaning system upward through the connector and at least partially into the nozzle, such that an upper end of the cleaning tool is positioned within the bubble. The cleaning tool includes a shaft with one or more radial protrusions. The method also includes rotating the cleaning tool around a central longitudinal axis through the shaft. The method also includes reciprocating the cleaning tool vertically. Rotating and reciprocating the cleaning tool causes the cleaning tool to dislodge at least a portion of solidified printing material within the nozzle such that at least a portion of the dislodged solidified printing material becomes positioned within the bubble or exits downward through the nozzle.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
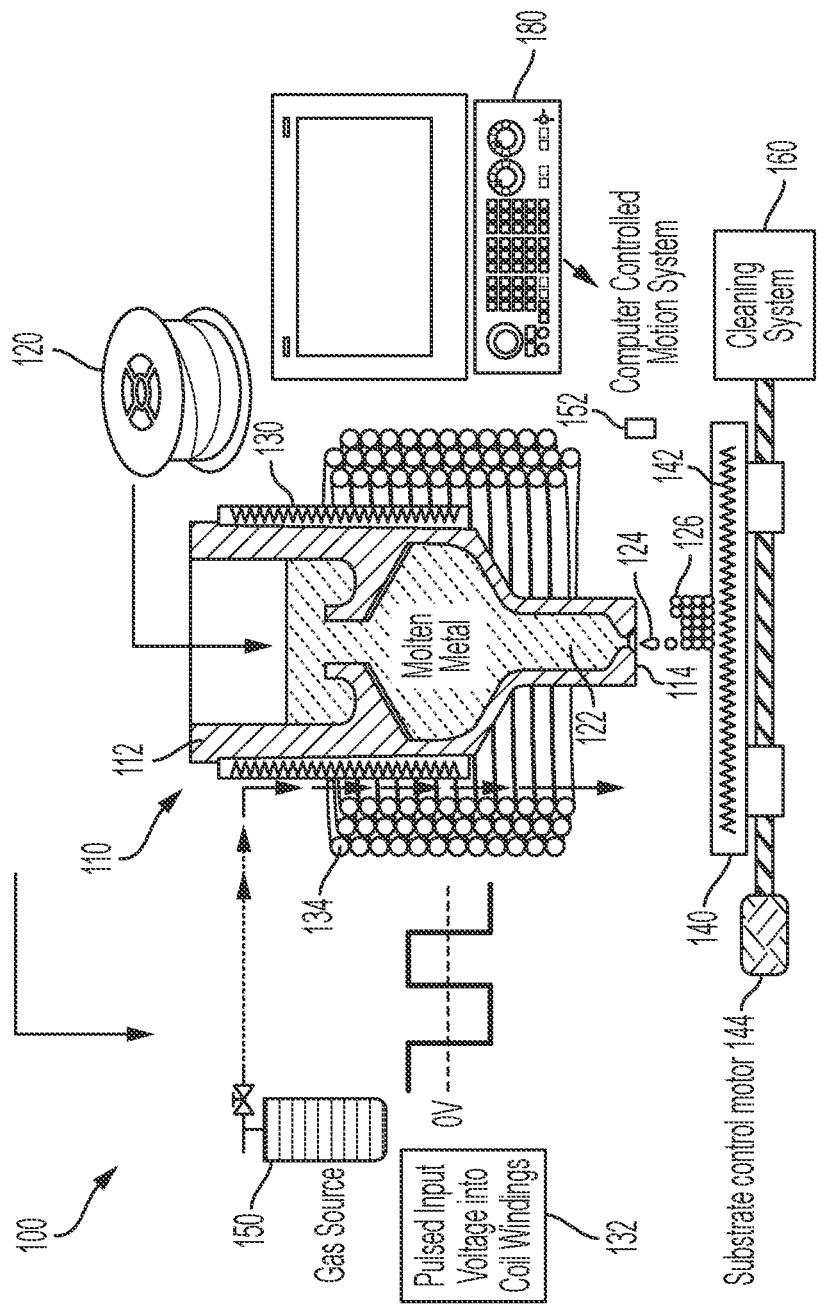
FIG. 1 depicts a schematic cross-sectional view of a 3D printer, according to an embodiment.

FIG. 1 depicts a schematic cross-sectional view of a 3D printer 100, according to an embodiment. The 3D printer 100 may include an ejector (also referred to as a pump chamber) 110. The ejector 110 may define an inner volume that is configured to receive a printing material 120. The printing material 120 may be or include a metal, a polymer (e.g., a photopolymer), or the like. For example, the printing material 120 may be or include aluminum (e.g., a spool of aluminum wire).

The 3D printer 100 may also include one or more heating elements 130. The heating elements 130 are configured to melt the printing material 120 within the inner volume of the ejector 110, thereby converting the printing material 120 from a solid material to a liquid material (e.g., liquid metal) 122 within the inner volume of the ejector 110.

The 3D printer 100 may also include a power source 132 and one or more metallic coils 134. The metallic coils 134 are wrapped at least partially around the ejector 110 and/or the heating elements 130. The power source 132 may be coupled to the coils 134 and configured to provide power thereto. In one embodiment, the power source 132 may be configured to provide a step function direct current (DC) voltage profile (e.g., voltage pulses) to the coils 134, which may create an increasing magnetic field. The increasing magnetic field may cause an electromotive force within the ejector 110, that in turn causes an induced electrical current in the liquid metal 122. The magnetic field and the induced electrical current in the liquid metal 122 may create a radially inward force on the liquid metal 122, known as a Lorentz force. The Lorentz force creates a pressure at an inlet of a nozzle 114 of the ejector 110. The pressure causes the liquid metal 122 to be jetted through the nozzle 114 in the form of one or more drops 124.

The 3D printer 100 may also include a build stage (also referred to as a substrate) 140 that is positioned below the nozzle 114. The build stage 140 may include a build plate, and the drops 124 that are jetted through the nozzle 114 may land on the build plate and cool and solidify to produce a 3D object 126. The build stage 140 may include a heater 142 therein that is configured to increase the temperature of at least a portion of the build stage 140. The 3D printer 100 may also include a build stage control motor 144 that is configured to move the build stage 140 as the drops 124 are being jetted (i.e., during the printing process) to cause the 3D object 126 to have the desired shape and size. The build stage control motor 144 may be configured to move the build stage 140 in one dimension (e.g., along an X axis), in two dimensions (e.g., along the X axis and a Y axis), or in three dimensions (e.g., along the X axis, the Y axis, and a Z axis). As used herein, the X and Y axes are in a horizontal plane, and the Z axis is vertical. In another embodiment, the ejector 110 and/or the nozzle 114 may be also or instead be configured to move in one, two, or three dimensions.

In one embodiment, the 3D printer 100 may also include one or more shield gas sources (one is shown: 150). The shield gas source 150 may be configured to introduce a shield gas that flows (e.g., downward) around the ejector 110, the nozzle 114, the heating elements 130, or a combination thereof. The shield gas may flow around and/or within the coils 134. The shield gas may flow proximate to (e.g., around) the drops 124, the 3D object 126, and/or the build stage 140. The shield gas may be or include an inert gas (e.g., argon).

The 3D printer 100 may also include a gas sensor 152. The gas sensor 152 may be positioned proximate to the drops 124, the 3D object 126, and/or the build stage 140. The gas sensor 152 may be configured to measure a concentration of the gas, oxygen, or a combination thereof.

The 3D printer 100 may also include a cleaning system 160. As mentioned above, at least a portion of the liquid printing material 122 may solidify within the ejector 110 and/or the nozzle 114. The solidified printing material may be or include dross (e.g., oxides and/or contaminants). At least a portion of the solidified printing material may build up around the interior of the nozzle 114, thus at least partially clogging the nozzle 114. As described in greater detail below, the cleaning system 160 may clean the at least a portion of the solidified liquid printing material (e.g., the dross) from the ejector 110. More particularly, the cleaning system 160 may dislodge and/or remove at least a portion of the solidified printing material from the nozzle 114.

The 3D printer 100 may also include a computing system 180. The computing system 180 may be configured to control the introduction of the printing material 120 into the ejector 110, the heating elements 130, the power source 132, the build stage control motor 144, the shield gas source 150, the shield gas sensor 152, the cleaning system 160, or a combination thereof. For example, during a pause in printing, the computing system 180 may be configured to cause the cleaning system 160 to clean the interior of the nozzle 114, as discussed in greater detail below.

Figure 2:
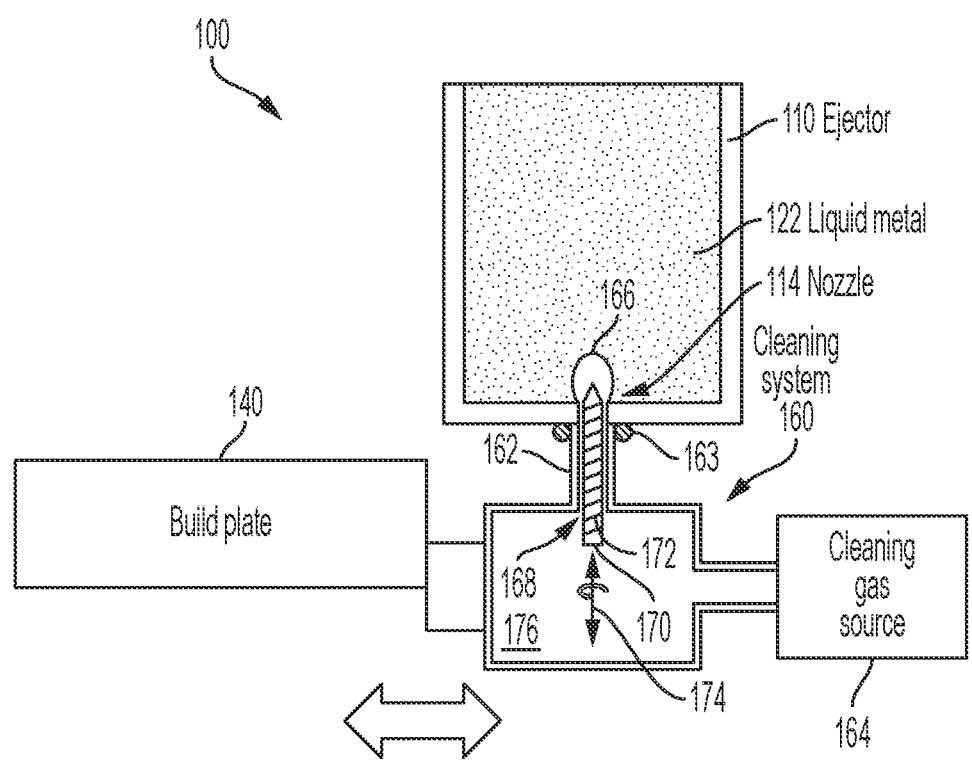
FIG. 2 depicts a more detailed schematic cross-sectional view of a portion of FIG. 1, according to an embodiment.

FIG. 2 depicts a schematic cross-sectional view of a portion of FIG. 1, according to an embodiment. FIG. 1 shows the 3D printer 100 in a first state where the 3D printer 100 is configured to print the 3D object 126 on the build stage 140, and FIG. 2 shows the 3D printer 100 in a second state where the cleaning system 160 is configured to clean the ejector 110 (e.g., the nozzle 114). To actuate from the first state into the second state, the ejector 110, the build stage 140, the cleaning system 160, or a combination thereof may move such that the ejector 110 transitions from being positioned above and/or aligned with the build stage 140 to being positioned above and/or aligned with the cleaning system 160. In the example shown, the cleaning system 160 may be coupled to a side of the build stage 140 (e.g., horizontally offset from the build stage 140). The portion of the build stage 140 to which the cleaning system 160 may be coupled may be at or near room temperature (e.g., 40° C. or less). In another example, the cleaning system 160 may be coupled to a separate 3D manipulation stage. The ejector 110 may move horizontally (to the right in FIG. 2) from a first position that is aligned with the build stage 140 to a second position that is aligned with the cleaning system 160. In another example, the build stage 140 and the cleaning system 160 may move horizontally (to the left in FIG. 2) from a first position where the ejector 110 is aligned with the build stage 140 to a second position where the ejector 110 is aligned with the cleaning system 160.

The cleaning system 160 may include a connector 162 that may be positioned at least partially below the nozzle 114. The connector 162 may be configured to connect to the nozzle 114. For example, when the 3D printer 100 is in the second state, the connector 162 may be configured to extend vertically upward into contact with the nozzle 114, and then the connector 162 may connect to the nozzle 114.

In one embodiment, the cleaning system 160 may also include a compliant member 163 that is configured to provide a gas-tight and/or liquid-tight seal between the nozzle 114 and the cleaning system 160 (e.g., the connector 162). The cleaning system 160 may also include a cleaning gas source 164. The cleaning gas source 164 may be configured to introduce (e.g., pump) a cleaning gas upward through the connector 162 and at least partially into the ejector 110 and/or the nozzle 114. The cleaning gas may be or include an inert gas (e.g., argon). In another embodiment, the cleaning gas may include oxygen or air. The cleaning gas may form a bubble 166 in a lower portion of the ejector 110 (e.g., the nozzle 114). In one embodiment, the bubble 166 may remain positioned proximate to the lower end of the ejector 110 (e.g., in and/or proximate to the nozzle 114), rather than floating upward toward the upper end of the ejector 110, due to the weight and/or density of the liquid printing material 122 in the ejector 110, which exerts a downward force on the bubble 166. The bubble 166 may have a volume from about 0.1 cm$^3$ to about 5 cm$^3$, about 0.2 cm$^3$ to about 3 cm$^3$, or about 0.3 cm$^3$ to about 1 cm$^3$.

In one embodiment, the pressure of the cleaning gas may be pulsed to assist with cleaning by inducing vibration into the walls of the nozzle 114. In another embodiment, the cleaning system 160 itself may be moved (e.g., pulsed and/or vibrated) horizontally and/or vertically to assist with cleaning by inducing vibration into the walls of the nozzle 114.

The cleaning system 160 may also include a cleaning tool 168. The cleaning tool 168 may be or include a vertical shaft 170 with one or more radial protrusions 172. In one embodiment, the radial protrusions 172 may be or include bristles such that the cleaning tool 168 functions as a brush. In another embodiment, the radial protrusions 172 may be or include a helical winding such that the cleaning tool 168 functions as a drill. The cleaning tool 168 may be configured to extend upward through the connector 162 and at least partially into the ejector 110 (e.g., the nozzle 114).

The cleaning tool 168 may mechanically dislodge at least a portion of the solidified printing material (e.g., dross) from within the ejector 110 (e.g., the nozzle 114). In one embodiment, the cleaning tool 168 may be rotated around a central (vertical) longitudinal axis 174 extending therethrough. When the cleaning tool 168 functions as a drill, the radial protrusions (e.g., helical winding) 172 may push or pull the dislodged solidified printing material downward through the connector 162 and into an interior volume 176 of the cleaning system 160. In another embodiment, the cleaning tool 168 may be moved up and down (e.g., multiple times) to facilitate dislodging the solidified printing material. For example, the cleaning tool 168 may be simultaneously rotated and reciprocated vertically. In another embodiment, ultrasonic excitation of the cleaning tool 168 can further enhance removal of the solidified printing material. In another embodiment, the cleaning gas may be or include hydrogen, and the cleaning tool 168 may be or include a metal tube with an insulating wall. This may allow the cleaning tool 168 to strike a plasma, which may reduce the dross.

In at least one embodiment, at least a portion (e.g., the upper end) of the cleaning tool 168 may be positioned at least partially within the bubble 166. As a result, when the cleaning tool 168 dislodges the solidified printing material, at least a portion of the dislodged solidified printing material may remain within the bubble 166 or fall out of the nozzle 114, rather than mixing with the liquid printing material 122. This may serve to prevent the dislodged solidified printing material from contaminating the liquid printing material 122. Alternatively, the cleaning tool 168 can extend beyond the top of the bubble 166 and entrain liquid to help remove freed particulates. In any case, a sacrificial ejection of printing material can be used to complete the nozzle cleaning.

Figure 3:
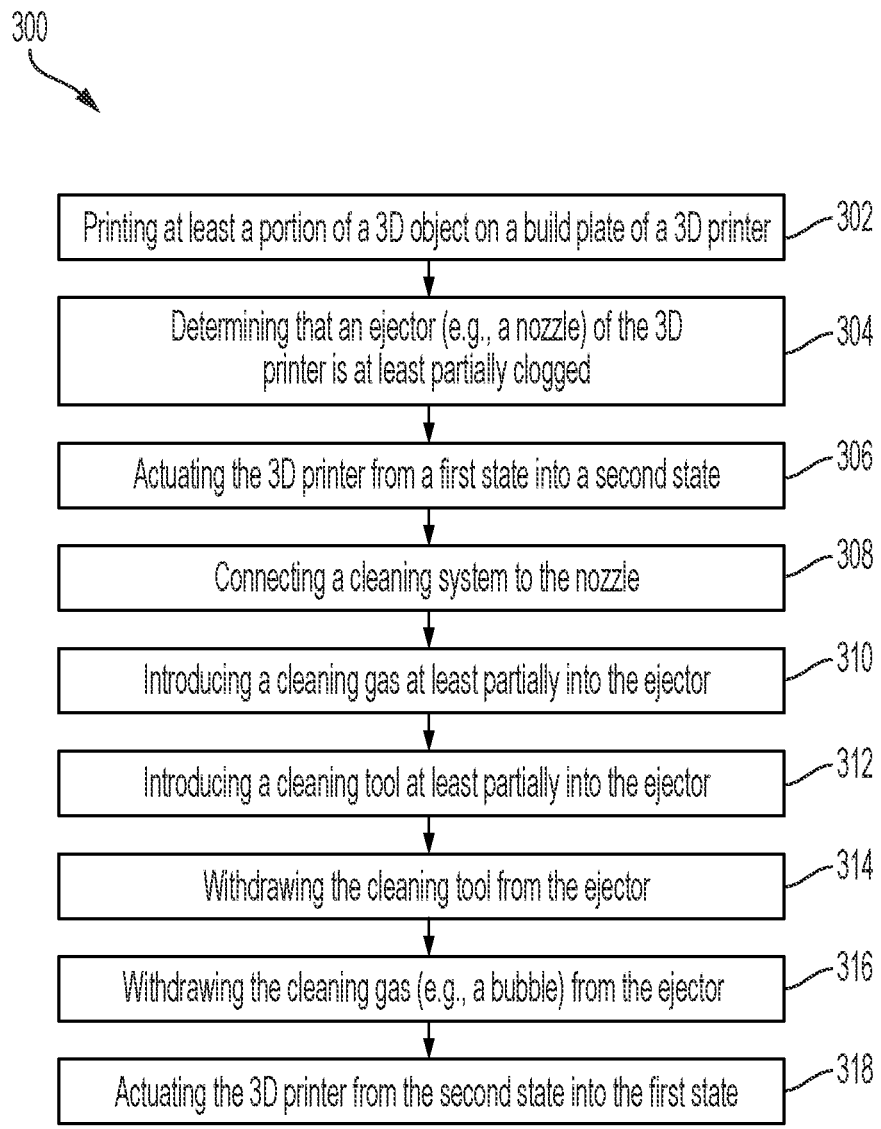
FIG. 3 depicts a flowchart of a method for cleaning the 3D printer, according to an embodiment.

FIG. 3 depicts a flowchart of a method 300 for cleaning the 3D printer 100, according to an embodiment. The method 300 may be particularly applicable to liquid metal drops 124 in 3D printing applications (as opposed to non-metal drops and/or non 3D printing applications) because molten metals at elevated temperatures generally tend to oxidize readily and form precipitates.

An illustrative order of the method 300 is provided below; however, one or more steps of the method 300 may be performed in a different order, performed simultaneously, repeated, or omitted. One or more steps of the method 300 may be performed (e.g., automatically) by the computing system 180.

The method 300 may include printing at least a portion of the 3D object 126 on the build stage 140, as at 302. This may include jetting the plurality of drops 124 through the nozzle 114 onto the build stage 140 to form the 3D object 126.

The method 300 may also include determining that the ejector 110 (e.g., the nozzle 114) is at least partially clogged, as at 304. As mentioned above, the nozzle 114 may be clogged (e.g., at least partially obstructed) with solidified printing material (e.g., dross). In one example, this step may include determining that a force required to jet the drops 124 is greater than a predetermined threshold. In another example, this step may include determining that a size of the drops 124 is less than a predetermined threshold. In another example, the determining may be based at least partially upon a predetermined amount of time and/or a predetermined amount of printing material 120 introduced into the ejector 110. Alternatively, cleaning can be performed on a periodic basis. For example, the timing of the cleaning may be at least partially dependent on the printing history, such as the amount of material ejected since the previous cleaning, elapsed time since last cleaning, etc.

The method 300 may also include actuating the 3D printer 100 from the first state into the second state, as at 306. As mentioned above, this may include moving the ejector 110, the build stage 140, the cleaning system 160, or a combination thereof such that the ejector 110 transitions from being positioned above and/or aligned with the build stage 140 to being positioned above and/or aligned with the cleaning system 160.

The method 300 may also include connecting the cleaning system 160 to the nozzle 114, as at 308. This may include extending the connector 162 upward, and/or connecting the connector 162 to the nozzle 114.

The method 300 may also include introducing the cleaning gas at least partially into the ejector 110, as at 310. This may include pumping the cleaning gas upward through the connector 162 and at least partially into the lower portion of the ejector 110 (e.g., the nozzle 114). As mentioned above, the cleaning gas may form the bubble 166. In at least one embodiment, the cleaning gas source 164 may maintain the cleaning gas at a predetermined pressure to prevent the weight of the liquid printing material 122 from pushing the bubble 166 downward and out of the ejector 110 (e.g., the nozzle 114).

The method 300 may also include introducing the cleaning tool 168 at least partially into the ejector 110, as at 312. This may include moving the cleaning tool 168 upward through the connector 162 and at least partially into the ejector 110 (e.g., the nozzle 114), the bubble 166, or a combination thereof. The cleaning tool 168 may also be rotated and/or reciprocated vertically to facilitate dislodging the solidified printing material from the inner surfaces of the ejector 110 (e.g., the nozzle 114). As mentioned above, at least a portion of the dislodged printing material may remain within the bubble 166.

The method 300 may also include withdrawing the cleaning tool 168 from the ejector 110, as at 314. This may include moving the cleaning tool 168 downward and out of the ejector 110 (e.g., the nozzle 114), the connector 162, the bubble 166, or a combination thereof. In one embodiment, the radial protrusions 172 may pull at least a portion of the dislodged solidified printing material out of the ejector 110 (e.g., the nozzle 114) together with the cleaning tool 168.

The method 300 may also include withdrawing the cleaning gas (e.g., the bubble 166) from the ejector 110, as at 316. As mentioned above, the cleaning gas source 164 may maintain the cleaning gas at a predetermined pressure to keep the bubble 166 in the ejector 110. Withdrawing the cleaning gas (e.g., the bubble 166) may include reducing the pressure of the cleaning gas using the cleaning gas source 164 so that the weight of the liquid printing material 122 pushes the bubble 166 downward and out of the nozzle 114. Any portion of the dislodged solidified printing material that is within the bubble 166 may exit the ejector 110 (e.g., the nozzle 114) together with the bubble 166. In at least one embodiment, withdrawing the cleaning gas (e.g., the bubble 166) may include exerting a suction (e.g., a vacuum force) on the bubble 166 to pull the bubble 166 out of the ejector 110 (e.g., the nozzle 114).

The method 300 may also include actuating the 3D printer 100 from the second state into the first state, as at 318. As mentioned above, this may include moving the ejector 110, the build stage 140, the cleaning system 160, or a combination thereof such that the ejector 110 switches relative alignment from being above and/or aligned with the cleaning system 160 to being above and/or aligned with the build stage 140.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A 3D printer, comprising:
   a nozzle; and
   a cleaning system comprising:
   a gas source configured to introduce a gas at least partially into the nozzle;
   a cleaning tool configured to remove solidified metallic dross from within the nozzle; and
   a connector configured to extend upward and to connect to the nozzle, and wherein the gas is configured to flow through the connector.

2. The 3D printer of claim 1, wherein the 3D printer is configured to actuate from a first state in which the nozzle is not aligned with the cleaning system to a second state in which the nozzle is aligned with the cleaning system.

3. The 3D printer of claim 1, wherein the 3D printer comprises an ejector configured to have a liquid printing material therein, wherein the nozzle is part of the ejector, and wherein the gas forms a bubble in the liquid printing material proximate to the nozzle.

4. The 3D printer of claim 3, wherein the gas source is configured to maintain the gas at a predetermined pressure, which maintains the bubble in the liquid printing material proximate to the nozzle.

5. The 3D printer of claim 3, wherein the gas source is configured to reduce a pressure of the gas, which allows a weight of the liquid printing material to push the bubble downward out of the nozzle.

6. The 3D printer of claim 1, further comprising a compliant member that is configured to form a seal between the nozzle and the connector.

7. The 3D printer of claim 1, wherein the cleaning tool is configured to extend upward through the connector and at least partially into the nozzle.

8. The 3D printer of claim 1, wherein an upper end of the cleaning tool is configured to be positioned within the bubble.

9. The 3D printer of claim 8, wherein the cleaning tool comprises a shaft with one or more radial protrusions, and wherein the cleaning tool is configured to rotate around a central longitudinal axis through the shaft, which causes the cleaning tool to dislodge at least a portion of solidified metallic dross within the nozzle.

10. A 3D printer, comprising:
    an ejector comprising a nozzle, wherein the nozzle is configured to jet a plurality of drops of liquid metal therethrough;
    a build stage positioned at least partially below the nozzle, wherein the drops are configured to cool and solidify on the build stage to form a 3D object; and
    a cleaning system, wherein the 3D printer is configured to actuate from a first state in which the nozzle is positioned above and aligned with the build stage to a second state in which the nozzle is positioned above and aligned with the cleaning system, and wherein the cleaning system comprises:
    a gas source configured to introduce a gas upward and at least partially into the ejector when the 3D printer is in the second state;
    a cleaning tool configured to remove solidified metallic dross from within the nozzle when the 3D printer is in the second state; and
    a connector configured to extend upward and to connect to the nozzle when the 3D printer is in the second state, and wherein the gas is configured to flow through the connector.

11. The 3D printer of claim 10, wherein the gas forms a bubble in the liquid metal in the ejector proximate to the nozzle.

12. The 3D printer of claim 11, wherein the cleaning tool is configured to extend upward through the connector and at least partially into the ejector, and wherein an upper end of the cleaning tool is positioned within the bubble.

13. The 3D printer of claim 12, wherein the cleaning tool comprises a shaft with one or more radial protrusions, wherein the cleaning tool is configured to rotate around a central longitudinal axis through the shaft, which causes the cleaning tool to dislodge at least a portion of solidified metallic dross within the nozzle such that at least a portion of the dislodged solidified metallic dross becomes positioned within the bubble.

14. A 3D printer, comprising:
    an ejector comprising a nozzle;
    a heating element configured to heat a solid metal within the ejector, thereby converting the solid metal to a liquid metal;
    a coil wrapped at least partially around the ejector;
    a power source configured to transmit voltage pulses to the coil, wherein the coil causes a plurality of drops of the liquid metal to be jetted through the nozzle in response to the voltage pulses;
    a build stage positioned at least partially below the nozzle, wherein the drops are configured to cool and solidify on the build stage to form a 3D object; and
    a cleaning system coupled to the build stage and positioned horizontally to a side of the build stage, wherein the 3D printer is configured to actuate from a first state in which the nozzle is positioned above and aligned with the build stage to a second state in which the nozzle is positioned above and aligned with the cleaning system, and wherein the cleaning system comprises:
    a connector configured to extend upward and to connect to the nozzle when the 3D printer is in the second state;
    a gas source configured to introduce a gas upward through the connector and at least partially into the ejector, wherein the gas forms a bubble in the liquid metal in the ejector proximate to the nozzle; and
    a cleaning tool configured to extend upward through the connector and at least partially into the ejector, wherein an upper end of the cleaning tool is positioned within the bubble, wherein the cleaning tool comprises a shaft with one or more radial protrusions, and wherein the cleaning tool is configured to rotate around a central longitudinal axis through the shaft and to reciprocate vertically, which causes the cleaning tool to dislodge at least a portion of solidified metallic dross within the nozzle such that at least a portion of the dislodged solidified metallic dross becomes positioned within the bubble or exits through the nozzle.

15. The 3D printer of claim 14, wherein the one or more radial protrusions comprise a helical winding, and wherein the cleaning tool rotating causes the helical winding to move at least a portion of the dislodged solidified metallic dross downward out of the nozzle and through the connector.

16. The 3D printer of claim 14, wherein the gas source is configured to maintain the gas at a predetermined pressure while the cleaning tool is positioned at least partially within the ejector, which maintains the bubble in the liquid metal in the ejector proximate to the nozzle.

17. The 3D printer of claim 14, wherein the gas source is configured to reduce a pressure of the gas after the cleaning tool is withdrawn from the ejector, which allows a weight of the liquid metal to push the bubble and the dislodged solidified metallic dross therein downward out of the nozzle and through the connector.

18. The 3D printer of claim 14, wherein the gas comprises an inert gas, and wherein the bubble has a volume from about 0.1 cm$^3$ to about 5 cm$^3$.

\* \* \* \* \*